United States Patent [19]

Runyan et al.

[11] 4,090,616
[45] May 23, 1978

[54] BALE LOADER

[76] Inventors: John G. Runyan, Easton, Mo. 64443; James H. Kline, Agency, Mo. 64401

[21] Appl. No.: 758,013

[22] Filed: Jan. 10, 1977

[51] Int. Cl.² .................................................. B65G 67/02
[52] U.S. Cl. ........................... 214/1 HH; 214/DIG. 4
[58] Field of Search ............. 214/766, 130 C, DIG. 4, 214/145 R, 350, 86 A, 78, 1 HH, 501; 254/139.1; 296/35 A, 23 MC

[56] References Cited

U.S. PATENT DOCUMENTS

| 403,766 | 5/1889 | Mette | 296/35 A |
|---|---|---|---|
| 3,883,020 | 5/1975 | Dehn | 214/86 A |
| 3,896,956 | 7/1975 | Hostetler | 214/78 |
| 3,897,880 | 8/1975 | Waske et al. | 214/1 HH |
| 3,957,167 | 5/1976 | Jacobson et al. | 214/145 R |
| 4,015,737 | 4/1977 | Wright et al. | 214/501 |
| 4,015,739 | 4/1977 | Cox | 214/130 C |
| 4,023,690 | 5/1977 | Goode | 214/78 |

OTHER PUBLICATIONS

Gold'n Spike Bale Carriers, Gold'n Industries.

Primary Examiner—Drayton E. Hoffman
Assistant Examiner—Ross Weaver
Attorney, Agent, or Firm—Lowe, Kokjer, Kircher, Wharton & Bowman

[57] ABSTRACT

A hay handling device is mounted in a vehicle bed to load, carry, and unload large hay bales. A rugged frame of the device is securely held in the vehicle bed by brackets which release the frame in selective fashion to permit its removal. A horizontal support member which is pivoted to the frame carries a central spear which is adapted to penetrate a bale resting on the ground. The spear is secured to a small sleeve which is slidably mounted on an upright post so that the elevation of the spear can be adjusted in order to accommodate bales of various sizes and vehicle beds of different heights. Shorter spears are located on opposite sides of the central spear to cooperate in handling the hay bale. A power winch operates on the upright post to pivot the support member in a manner to raise a bale which the spears have penetrated.

4 Claims, 3 Drawing Figures

BALE LOADER

BACKGROUND AND SUMMARY OF THE INVENTION

This invention relates generally to the handling of hay and deals more specifically with an apparatus which is capable of loading and carrying large hay bales.

The widespread popularity of large cylindrical hay bales in recent years has led to difficult handling problems, principally because of the large size and weight of the bales. Typically, the bales are 4 or 5 feet in diameter and weigh over one thousand pounds. As can be readily appreciated, manual handling of these bales is precluded, as is handling with conventional farm equipment such as front end loaders and the like.

The specialized equipment that had been developed to handle the large cylindrical bales has been unsatisfactory in many respects. Such equipment usually provides one or more spears which pierce the bale and are then raised in order to lift the bale off of the ground for transport. Aside from being unduly complicated and expensive, equipment of this type is further characterized by excessive weight and substantial maintenance requirements. Moreover, existing devices are usually capable of attachment only to a tractor which is thereby tied up for an extended time period during which it is unavailable for other work. Safety problems are also encountered during loading and unloading of the bales, and the bales are often carried at unstable positions such that they can fall off or overturn the carrying equipment.

In addition, existing hay handling devices fail to take into account the rather wide variations in the size of the bales. The spear is set at a constant height above the ground and is therefore improperly located with respect to bales which vary substantially from the normal size. Furthermore, the height of the vehicle bed above the ground varies considerably among the various types of vehicles. Consequently, the bale may be pierced a considerable distance above or below its center such that it can not be handled in a satisfactory manner. Even if it is loaded properly, the bale may fall off during transport, or it may be difficult or unsafe to unload due to the offset location of the spear from the center of the bale.

In view of these difficulties with existing equipment, it is the primary goal of the present invention to provide an improved device for handling large hay bales in a quick, safe, and efficient manner.

More specifically, it is an object of the invention to provide a bale loading device which may be quickly and easily mounted in and removed from the bed of a vehicle such as a conventional "pickup" type truck.

Another object of the invention is to provide a bale loading device that includes a sturdy frame structure which supports the bale carrying members and which may be easily moved in and out of the vehicle bed.

A further object of the invention is to provide, in a bale loading device of the character described, an effective means for firmly yet releasably securing the frame in a vehicle bed without significantly modifying the bed or permanently impairing its cargo carrying ability.

Yet another object of the invention is to provide a bale loading device of the character described which carries the bale at a stable position a relatively short distance above the ground.

In conjunction with the preceding object, it is a further object of the invention to provide, in a bale loading device of the character described, a spear member for piercing the bale which is adjustable in elevation. This important feature permits bales of various sizes to be safely handled on vehicles having beds of various heights, since the spear can be adjusted to a position at which it will pierce the bale near its center.

An additional object of the invention is to provide a bale loading device which is improved as to its structural characteristics in comparison to existing equipment.

A still further object of the invention is to provide a bale loading device of the character described which is simple and economical to construct and which may be easily operated by a single worker.

Other and further objects of the invention, together with the features of novelty appurtenant thereto, will appear in the course of the following description.

DETAILED DESCRIPTION OF THE INVENTION

Figure 1:
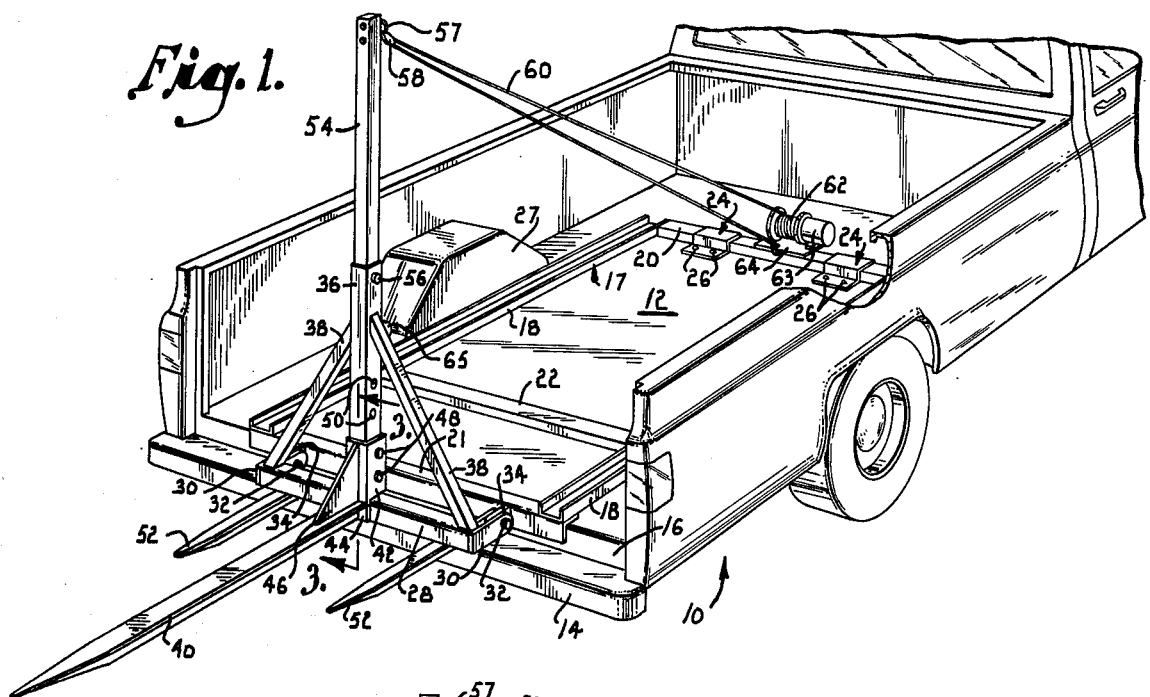
Figure 2:
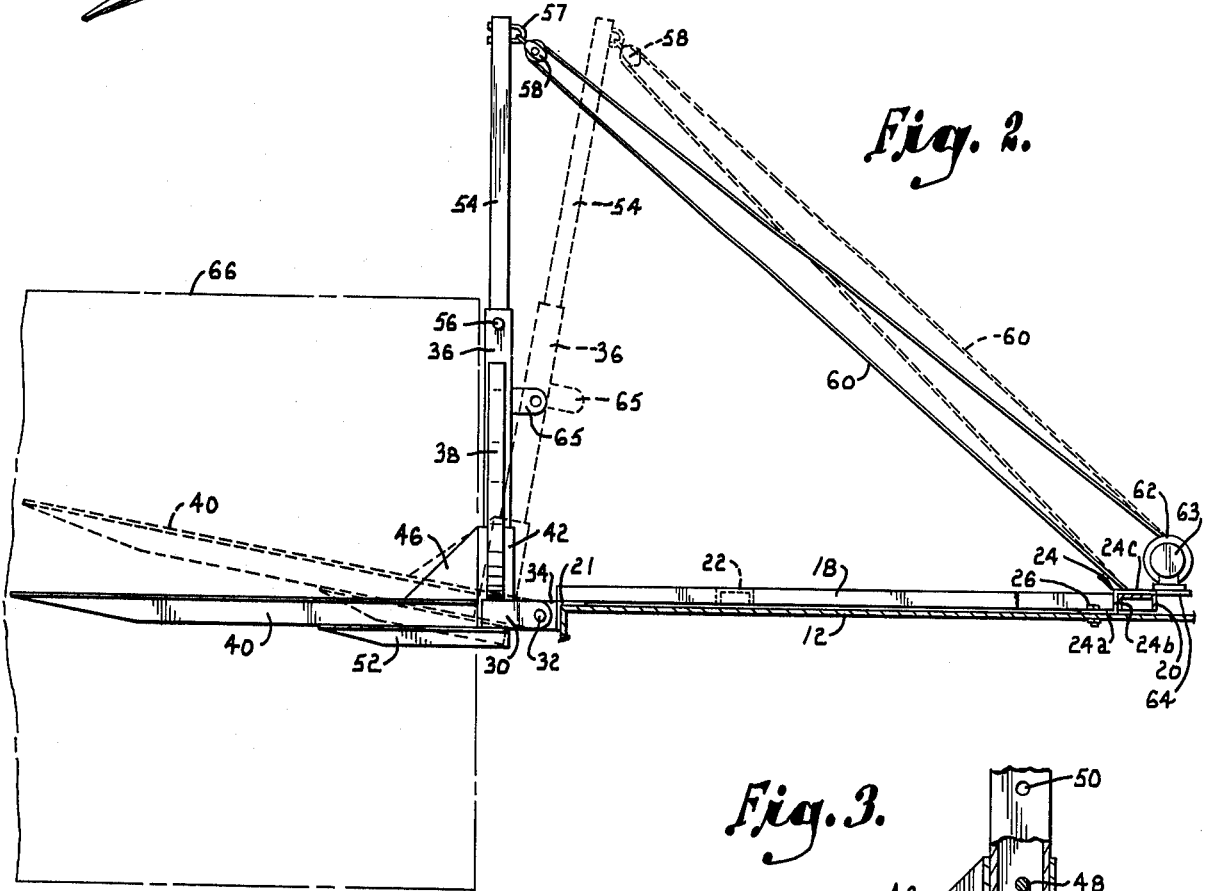
Figure 3:
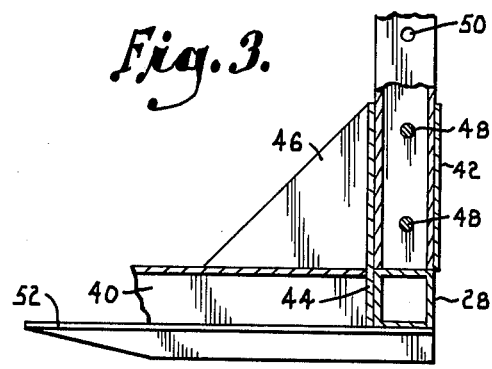

In the accompanying drawing which forms a part of the specification and is to be read in conjunction therewith and in which like reference numerals are used to indicate like parts in the various views:

FIG. 1 ia a perspective view showing the hay handling apparatus of the present invention installed in a truck bed;

FIG. 2 is a side elevational view showing the hay handling apparatus engaged with a large hay bale, the broken lines indicating movement of the apparatus to a carrying position wherein the bale is raised above the ground for transport; and FIG. 3 is a fragmentary sectional view on an enlarged scale taken generally along line 3—3 of FIG. 1 in the direction of the arrows.

Referring now to the drawing in detail and initially to FIG. 1, reference numeral 10 generally designates a conventional "pickup" type truck having a flat bed 12 and the usual rear bumper 14. At its rearward end, bed 12 terminates in a vertical surface 16 which extends downwardly to the bumper 14. A standard tailgate (not shown) which normally closes the rear of the truck bed has been removed from the vehicle.

In accordance with the present invention, a generally rectangular frame structure 17 is provided which may be installed in and removed from the truck bed 12. The frame 17 includes a pair of parallel channel sections 18 which are spaced apart from one another. When the frame is installed, channels 18 extend longitudinally along the truck bed on opposite sides of its longitudinal centerline. Extending rigidly between the channels 18 at their forward ends is an inverted channel 20, while an angle section 21 is secured to extend rigidly between the rearward ends of channels 18. The angle 21 is welded to the bottom surfaces of channels 18 such that its vertical flange extends below the remainder of the frame in order to flatly engage surface 16. The frame additionally includes a channel 22 which extends rigidly between intermediate portions of channels 18.

Frame 17 is held in place in the truck bed by a pair of generally Z-shaped brackets 24 which are located near the forward end of the truck bed on opposite sides of its longitudinal centerline. With reference to FIG. 2, brackets 24 have flat lower flanges 24a which are bolted at 26 to bed 12. A vertical web 24b of each bracket extends upwardly from the vehicle bed, and each bracket has an upper horizontal flange 24c which is spaced above the vehicle bed a distance to closely overlie channel 20. When the frame 17 is installed in the vehicle bed 12, channel 20 is inserted within brackets 24, with webs 24b preventing the frame from moving rearwardly and flanges 24c preventing the forward end of the frame from raising. Angle 21 has its vertical flange lying against surface 16 of the truck to prevent the frame from sliding forwardly in the bed, while the side channels 18 engage the wheel wells 27 to prevent sideward movement of the frame.

Pivoted to frame 17 is a horizontal support member 28 in the form of a square, rigid tube. A pair of bracket plates 30 are welded in spaced relation to each end of member 28 in forward extension therefrom. Pivot pins 32 pivotally connect lugs 34 between the pairs of bracket plates 30. Lugs 34 are secured to project rearwardly from angle 21. Member 28 is thus coupled with the frame in a manner to pivot about the horizontal axis provided by pins 32.

Extending upwardly from connection with a central portion of member 28 is an upright post structure which includes a square tube 36. Inclined braces 38 extend from the upper portion of tube 36 to connection near the opposite ends of member 28. In order to pierce a hay bale, a rearwardly projecting spear 40 is mounted to the post structure. The spear 40 is carried on a short square sleeve or tube 42 which is sleeved over tube 36. Tube 42 has a flat extension plate 44 which extends downwardly on the rearward side of the tube. Tube 42 normally rests on top of member 28 with the extension plate 44 lying against the rearward surface of member 28, as best shown in FIG. 3. Spear 40 is rigidly secured to extend rearwardly from plate 44, and the spear is thus normally fronted by the sturdy support member 28 which provides bracing to resist forces tending to bend or otherwise disorient the spear member. A gusset plate 46 is secured to tube 42 and to spear 40.

The short tube 42 which carries spear 40 is slidable up and down on tube 36 so that the elevation of the spear can be adjusted. A pair of removable pins 48 may be extended through holes in tube 42 and also through selected holes 50 in tube 36 in order to secure spear 40 in place on the post structure. There are a number of holes 50 spaced along tube 36 so that spear 40 can be set at a variety of elevations.

Spear 40 is a T-shaped member in section, having a horizontal upper portion and a vertical flange. The spear tapers to a point in order to provide a sharp tip on its rearward end for piercing of the hay. On opposite sides of spear 40, a pair of shorter spears 52 are secured to extend rearwardly from member 28. The short spears 52 are parallel with spear 40 and are also T-shaped in section with sharply pointed tips. Spears 52 are welded to the underside of member 28 near its opposite ends and are thus slightly lower than spear 40, as shown in FIG. 2. In the preferred embodiment, spear 40 is approximately 4 feet long, while spears 52 are between 1 and 2 feet long.

The upright post structure includes still another square tube 54 which is inserted in the top end of tube 36 to essentially form an upward continuation thereof. A pin 56 secures tubes 36 and 54 together. Near its upper end, tube 54 is provided with a U-shaped bracket 57 to which a pulley 58 is hooked. Pulley 58 receives the cable 60 of a conventional power winch 62 which is driven by a motor 63. The winch and motor assembly is mounted on a plate 64 which is secured to the forward channel section 20 of the frame. Cable 60 is drawn around pulley 58 and tied at its end to plate 64. Consequently, when winch 62 winds up the cable, the top end of tube 54 is pulled forwardly to pivot support member 28 and the connected components upwardly about the horizontal pivot axis of pins 32.

An apertured ear plate 65 is welded or otherwise rigidly connected to tube 36 near its upper end. Plate 65 provides a connection by which the apparatus may be coupled with the third point of a conventional three point tractor hitch (not shown), with the other two points of the hitch being pivoted between the pairs of bracket plates 30 when the unit is tractor mounted. In addition, the ear plate 65 serves as a stop which engages channel 22 when the apparatus is pivoted to its extreme forward position, thereby distributing the weight of the bale relatively uniformly on the vehicle bed. This engagement of plate 65 with channel 22 also assures that the center of gravity of the bale remains far enough to the rear to maintain the bale in position to automatically drop to the ground upon release of the winch 62.

To install the apparatus in the truck bed 12, channel 20 is first inserted within brackets 24, and the flange of angle member 21 is dropped into engagement with surface 16 to assist the brackets in holding the frame firmly in place. With winch 62 released and cable 60 unwound so that bracket plates 30 rest on top of bumper 14, the vehicle is backed toward one end of a large hay bale such as the bale shown in broken lines in FIG. 2 and designated by numeral 66. Spear 40 projects horizontally and is adjusted on the post structure to a height at which it will penetrate the end of the bale substantially centrally. The short spears 52 pierce the bale on opposite sides of and slightly below the center. When the spears are fully embedded in the bale 66, winch 62 is operated to wind up cable 60, thereby pivoting the apparatus upwardly, preferably to the raised position shown in broken lines in FIG. 2. This raises the bale off of the ground so that it may be carried by the truck 10.

The spears 40 and 52 are inclined upwardly from front to rear in order to firmly hold the bale and prevent it from falling off during transport. The bale is preferably carried at a relatively low position to maintain its center of gravity low for stable transport. However, the apparatus may be pivoted upwardly beyond the broken line position of FIG. 2 if necessary or desirable. Even though the large spear 40 bears most of the weight of the bale, the shorter spears 52 support a substantial portion of the load and serve a stabilizing function in that they prevent the bale from twisting or turning on spear 40. In addition, some of the weight of the bale is supported by support member 28 and tube 36.

Bale 66 is unloaded simply by releasing winch 62. The weight of the bale causes it to drop to the ground as it pivots the apparatus back to the solid line position of FIG. 2. The truck may then be driven forwardly to withdraw spears 40 and 52 from the bale and leave it standing on the ground.

If a hay bale considerably larger than normal is to be handled, or if the vehicle bed is lower than normal, spear 40 should be raised on the post to a position wherein it will be able to penetrate the bale near its center. Raising of the spear is accomplished by removing pins 48, sliding tube 42 upwardly to the desired position, and reinserting pins 48 in the selected holes 50 in order to secure tube 42 in its new position.

When not in use, the hay handling apparatus may be stored in the truck bed 12 in a fully retracted position wherein tubes 36 and 54 lie on the bed and spears 40 and 52 point upwardly. When the truck bed 12 is to be used for another purpose, the apparatus may be completely removed by raising the rearward portion of frame 17 so that angle 21 clears surface 16. The frame may then be slid forwardly to remove channel 20 from brackets 24. Since the frame is then fully released, it may be lifted out of the vehicle bed and stored until needed again.

It is contemplated that the apparatus, without the frame structure 17, will be mounted on a tractor in some instances. In this case, two points of the three point tractor hitch will be pinned between the two sets of plates 30, and the third point will be pinned to the ear plate 65. The power system of the tractor will be used to raise and lower a bale.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described the invention, we claim:

1. Apparatus for handling a large bale of hay, said apparatus comprising:
   a support member adapted to be coupled with a vehicle for pivotal movement about a generally horizontal pivot axis;
   a substantially upright post structure coupled with said support member for movement therewith about said pivot axis;
   a sleeve member mounted on said post structure for up and down sliding movement thereon between a plurality of spaced apart positions without removing said sleeve member from the post structure;
   means for releasably securing said sleeve member at each of said spaced apart positions on said post structure;
   a spear member for piercing a hay bale, said spear member being rigidly coupled with said sleeve member to move with said support member and post structure in a manner to raise and lower the bale in response to pivoting of said support member about its pivot axis; and
   power means for pivoting said support member about its pivot axis in a direction to raise the bale from the ground for transport.

2. Apparatus as set forth in claim 1, including second and third spear members for piercing the bale coupled with said support member on opposite sides of the first mentioned spear member and movable with said support member to assist in raising the bale.

3. Apparatus as set forth in claim 1, wherein:
   said support member is oriented substantially horizontally;
   said sleeve member includes a downward extension which lies directly against said support member when said sleeve member is at a preselected position alone said post structure; and
   said spear member is rigidly carried directly on said extension to project generally rearwardly therefrom.

4. Hay bale handling apparatus as set forth in claim 1, further adapted for removable installation in a vheicle bed having a generally rearwardly facing surface at the rear end thereof, said apparatus comprising:
   a rigid frame adapted for removable installation in the vehicle bed and including a first frame member engageable with said surface in a manner to prevent forward sliding of said frame in the vehicle bed;
   a second rigid frame member rigidly coupled with said first frame member and adapted to lie on the vehicle bed at a location forwardly of the first member;
   at least one bracket mounted on the vehicle bed and having a first portion extending upwardly therefrom and a second portion spaced above the bed to cooperate with said first portion to present a forwardly opening space for receiving said second frame member, said second portion overlying said second frame member when same is received in said space, and said first portion preventing rearward sliding of said frame in the vehicle bed, whereby said frame is releasably secured on the vehicle bed.

* * * * *